3,376,294
6-FLUORO-16-METHYLENE STEROID COMPOUNDS AND PROCESS
Eugene J. Agnello and Gerald D. Laubach, Lyme, and Walter T. Moreland, Niantic, Conn., assignors to Chas. Pfizer & Co., Inc., New York, N.Y., a corporation of Delaware
No Drawing. Filed Apr. 26, 1961, Ser. No. 105,576
5 Claims. (Cl. 260—239.55)

This application is concerned with new and useful steroid compounds, the process by which they are prepared and with new and valuable intermediates in their preparation.

The process and the compounds of this invention are shown in the following synthetic sequence which starts with the known compound 16-methyl-$\Delta^{5,16}$-pregnadiene-$3\beta$-ol-20-one.

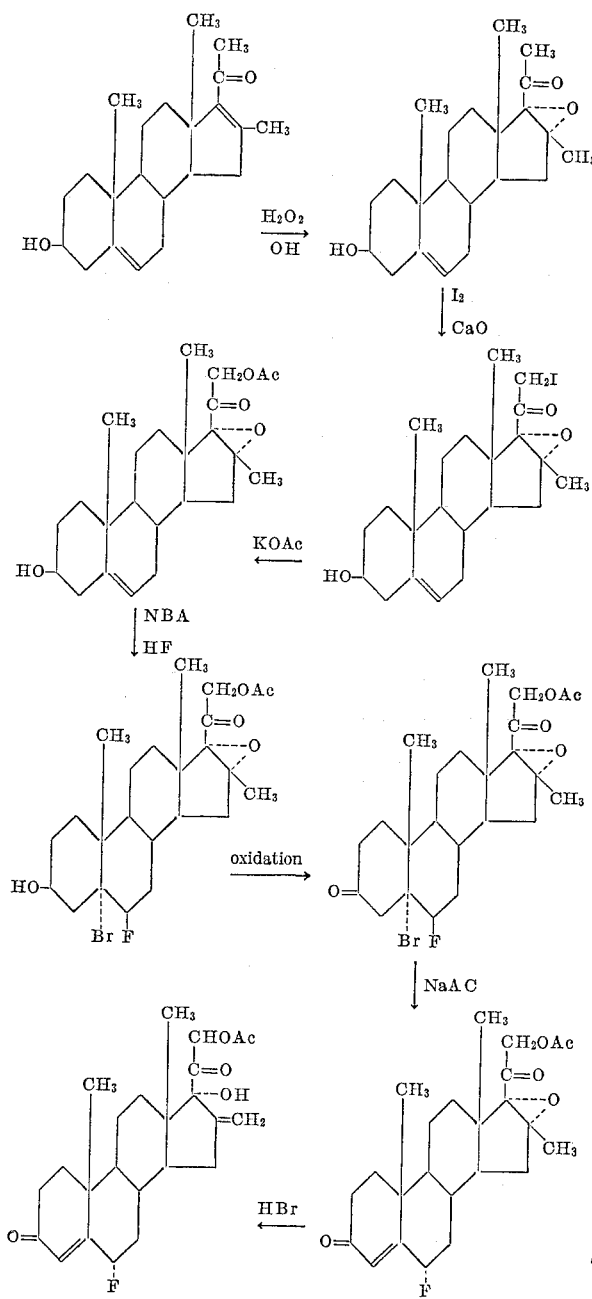

In the above synthesis, Ac designates an acyl hydrocarbon group containing only carbon, hydrogen and oxygen up to a total of five carbon atoms. In the usual case it will be an acetyl group.

It will be noted that the final treatment with hydrobromic acid has the combined effect of splitting the 16,17-epoxido group to form a $17\alpha$-hydroxyl group and isomerizing the $6\beta$-fluorine atom to the $6\alpha$-position.

The compound $6\alpha$ - fluoro - 16-methylene-$\Delta^4$-pregnene-$17\alpha$,21-diol-3,20-dione and its 21-esters are valuable since they can be converted to therapeutically active compounds such as $6\alpha$ - fluoro-16-methylene-$\Delta^4$-pregnene-$11\beta$,$17\alpha$,21-triol-3,20-dione as claimed in copending and concurrently filed patent application Ser. No. 117,379, now Pat. No. 3,067,197.

In the first step of this valuable process, the starting compound is converted to $16\alpha$,$17\alpha$-epoxide. This conversion is effected by reaction between the steroid substrate and an excess of an equimolar mixture of hydrogen peroxide and sodium hydroxide in a liquid reaction medium. The temperature of the reaction is from about 18° C. to about 35° C. and the time is from about one-half to about six hours. In preferred operations the temperature is from about 25° to about 30° C. and the time from about one-half to about six hours. The reaction is carried out in a methanol or ethanol solvent which may contain up to 50% by volume of a halogenated hydrocarbon solvent containing up to two carbon atoms such as methylene chloride or ethylene chloride. Aqueous sodium hydroxide solution of from about 15% to about 40% is generally employed together with 20% to 35% hydrogen peroxide. The latter reagents are used in equimolar quantities with respect to each other and in large excess, e.g. 100% to 1000% with respect to the steroid. The extent of the excess is immaterial. In fact reaction production is obtained even if an excess is not used. For most efficient utilization of the steroid, however, those skilled in the art will wish to use at least a 10% molar excess.

The product may be isolated in any convenient manner. One especially useful procedure is to first neutralize by the addition of aqueous acetic acid and then separate the organic layer. The aqueous layer is then extracted several times, e.g. two to four times with equal volumes of the same halogenated hydrocarbon used in the original reaction. The combined organic layers are dried over an anhydrous drying agent such as sodium sulfate, filtered and the desired product recovered by removal of the solvent in vacuo. In the event that no halogenated hydrocarbon solvent is employed in the original reaction mixture, any suitable halogenated hydrocarbon solvent of the class described above can be used for extraction.

The new compound prepared by this process is included within the purview of the invention. It is $16\alpha$,$17\alpha$-epoxido-$16\beta$-methyl-$\Delta^5$-pregnene-$3\beta$-ol-20-one.

In the next step, this synthetic compound prepared as described above is converted to a 21-iodo compound under highly selective conditions. The product prepared by this reaction is new and it is specifically intended to include it within the scope of the invention. It is $16\alpha$,$17\alpha$-epoxido-$16\beta$-methyl-21-iodo-$\Delta^5$-pregnane-$3\beta$-ol-20-one.

The reaction involves the treatment of the steroid in a solvent system consisting of tetrahydrofuran and a lower alkanol containing up to four carbon atoms in a volume ratio of two to one with from 4 to 6 molar equivalents of calcium oxide and 1.5 to 2 molar equivalents of iodine, the solvent system containing tertiary butyl hydroperoxide in a quantity equivalent to from 0.006 to 0.018 g. iodine/ml. tetrahydrofuran. The time of the reaction is from about 2 to about 5 hours.

The product may be isolated by pouring the reaction mixture into water which may contain sodium thiosulfate and acetic acid whereupon the desired product precipitates and can be recovered by filtration. The purpose of the thiosulfate and acetic acid is to destroy excess iodine.

The reaction may be carried out in an inert atmosphere, a nitrogen atmosphere to minimize side reactions. This is not necessary, however.

The iodo compound is next converted to an acyloxy compound by replacement of the iodine atom with an acyloxy group containing up to five carbon atoms. Basically, this is a reaction with a sodium or potassium salt of an organic acid, and it may be carried out either by direct addition of the sodium or potassium salt to a solution of the iodo steroid or by in situ formation of the salt in the solution containing the steroid. In either event, the reaction is between the iodo steroid and the salt, for example, sodium or potassium acetate, propionate, butyrate or valerate, and takes place in a lower aliphatic oxygenated solvent containing up to five carbon atoms including esters such as ethyl acetate or ketones such as acetone or methyl isopropyl ketone. The reaction takes place at a temperature of from about 40° C. to about 100° C. during a period of from about four to about twenty-four hours. A large excess of salt is generally employed to insure complete reaction of the steroid. Thus, a quantity of the salt ranging from about 200% to about 2000% or even more is used with from about 1000% to about 2000% being preferred.

In a preferred operation, the salt is generated in situ by adding the steroid in acetone to an acetone solution containing equimolar portions of potassium bicarbonate and acetic acid or other selected acid and refluxing the mixture for from about 10 to about 16 hours. A sufficient quantity of acid and salt should be used to generate the desired excess of the potassium salt.

Whichever procedure is used, the product may be isolated by removing the solvent in vacuo and washing the residue with a minimum amount of water to remove the inorganic salts. Alternatively, the reaction mixture may be diluted with water and the resulting solution filtered to obtain the desired compound or extracted with an organic solvent. Suitable solvents include hydrocarbon and halogenated hydrocarbon solvents containing up to seven carbon atoms including, for example, benzene, toluene, chlorobenzene, carbon tetrachloride or chloroform. The product is isolated from the organic solution preferably by removal of the solvent in vacuo. It is desirable although not necessary to dry the organic solution over an anhydrous drying agent such as sodium or magnesium sulfate before evaporating the solvent.

Compounds prepared by the above described process are new and are included within the scope of this invention. They include $16\alpha,17\alpha$-epoxido-$16\beta$-methyl-$\Delta^5$-pregnene-$3\beta,21$-diol-20-one and the 21-acyl esters thereof wherein the acyl group contains up to five carbon atoms.

A $5\alpha$-bromo-$6\beta$-fluoro compound is next prepared. This is accomplished by reaction with N-bromoacetamide in the presence of anhydrous hydrogen fluoride. The reaction is carried out in a solvent system consisting of tetrahydrofuran and methylene chloride containing from about 20% to about 40% tetrahydrofuran by volume. Other solvent systems, for example, dioxane and chloroform can be used, but it is preferred to use the tetrahydrofuranmethylene chloride system since reaction in this system affords crystalline products of relatively high purity.

From about 1.05 to about 1.5 molar equivalents of N-bromoacetamide are employed, preferably, from about 1.05 to about 1.15. An excess of from about 25 to about 100 molar equivalents anhydrous hydrogen fluoride, preferably from about 45 to about 55 molar equivalents is used.

The reaction is carried out at a temperature of from about −80° C. to about −50° C., preferably, from about −80° C. to about −70° C. for a period of from about one to about sixteen hours, preferably, from about one to about two hours.

The product is isolated at the end of the reaction period by cautiously pouring the reaction mixture into an aqueous solution of potassium carbonate or bicarbonate containing sufficient alkaline reagent to neutralize substantially all of the acid present. The use of a sodium base is best avoided because the sodium fluoride which forms is of low solubility in water and its precipitation increases the mechanical difficulty of working with the mixture. The organic layer is separated and the aqueous layer, preferably, extracted with additional quantities of the methylene chloride or other water insoluble solvent used for the reaction. It is then washed with dilute aqueous alkaline reagent until neutral and finally with water. The desired compound is isolated from the organic layer, preferably, after drying over an anhydrous drying agent, such as anhydrous sodium sulfate by evaporation of the solvent in vacuo.

Compounds prepared by this procedure are new and it is specifically intended to include them within the scope of the invention. They include $5\alpha$-bromo-$6\beta$-fluoro-$16\alpha,17\alpha$-epoxido-$16\beta$-methyl-pregnane-$3\beta,21$-diol-20-one and the 21-acyl esters of this compound, the acyl moiety containing up to five carbon atoms as described above.

The hydroxyl group at the 3-position is next oxidized to form a 3-keto compound. The choice of oxidizing agent is not critical although it is preferred to use chromic acid in accordance with standard procedures. One procedure which is especially effective is to use 8 N chromic acid prepared by dissolving 66.7 g. of chromic acid in a minimum of water and adding 53.3 ml. of concentrated sulfuric acid. The mixture is made up to a total volume of 250 ml. by the addition of acetone. The use of this reagent is illustrated in the examples.

Alternatively, the standard chromic acid-acetic acid couple can be employed. This reagent is prepared by dissolving sufficient chromium trioxide in a 9:1 acetic acid-water mixture to provide a solution containing 76 mg. of chromium trioxide per ml.

Other oxidizing agents well known in the art can also be employed. These include for example, sodium dichromate, N-bromoacetamide, and aluminum isopropoxide or aluminum tert-butoxide in the presence of a hydrogen acceptor such as acetone or cyclohexane in an inert organic solvent such as benzene, toluene or xylene. A chromic acid-pyridine complex can also be used as the oxidizing agent.

Compounds prepared by this process are new and are included within the scope of the invention. They include $5\alpha$-bromo-$6\beta$-fluoro-$16\alpha,17\alpha$-epoxide-$16\beta$-methyl-pregnane-21-ol-3,20-dione and the 21-acyl esters thereof wherein the acyl group contains up to five carbon atoms.

In the next step of this valuable synthetic sequence, the $5\alpha$-bromine atom is removed. This is accomplished by heating the steroid compound in a reaction inert lower aliphatic oxygenated organic solvent containing up to eight carbon atoms in the presence of an alkaline reagent, preferably a salt such as, for example, sodium acetate, sodium propionate, potassium acetate, sodium carbonate or potassium bicarbonate which hydrolyzes to give a mildly alkaline solution. Other bases such as sodium or potassium hydroxide can be used, but there is some tendency towards degradative side reactions when these reagents are employed. Suitable solvents include, for example, methanol, ethanol, propanol, ethyl acetate, methyl propionate, methyl isopropyl ketone or di-n-butyl ketone.

At least a molar equivalent of alkaline reagent, and preferably a molar excess of from about 30% to about 200% should be used.

The temperature range for obtaining optimum yields is from about 50° C. to about 130° C. The duration of the reaction is from about one-half to about four hours.

It is preferred to carry the reaction out at a temperature range of from about 50° C. to about 75° C. for a period of from about one-half hour to about one hour. It is convenient to select a solvent with a boiling point under atmospheric conditions within the temperature range and to reflux the reaction mixture for the selected period of time.

Refluxing the steroid in methanol in the presence of sodium acetate for a period of about forty minutes provides very good yields.

The product is isolated in accordance with standard means known in the art. For example, it can be precipitated by the addition of water if the reaction solvent is water miscible. Alternatively, with a water immiscible solvent, the solvent may be evaporated in vacuo and the product purified by washing the residue with water. Further purification may be effected by recrystallization from isopropanol or other suitable solvent or by trituration with ethyl acetate.

The new compounds prepared by this reaction are included within the scope of this invention. They include 6β - fluoro-16α,17α-epoxido-16β-methyl-Δ⁴-pregnene-21-ol-3,20-dione and the 21-acyl esters thereof wherein the acyl moiety contains up to five carbon atoms.

In the final step of this valuable synthetic method, the epoxide group at the 16,17-position is cleaved with hydrogen bromide to effect the introduction of a hydroxyl group at the 17-position with simultaneous formation of the 16-methylene group. During the course of the reaction, the 6β-fluoro-atom is isomerized to the 6α-position. The thus produced compounds which are included within the purview of this invention include 6α-fluoro-16-methylene-17α,21-diol-3,20-dione and the 21-acyl esters thereof wherein the acyl group contains up to five carbon atoms. The reaction is effected by contacting the steroid substrate with hydrogen bromide in a reaction inert organic solvent at a temperature of from about 15° C. to about 40° C. for a period of from about four to about twenty-four hours. The amount of hydrogen bromide used is not critical. Theoretically only a catalytic amount need be employed since it is regenerated in the reaction. It is, however, generally preferred to use at least 0.1 molar equivalents of this reagent. In practice, from about 0.1 to about 0.33 molar equivalents of hydrogen bromide in a lower organic acid solvent containing up to five carbon atoms is used. It is preferred to use acetic acid.

Suitable organic solvents for the reaction include halogenated hydrocarbon solvents of the class described above and these may be mixed with ether to enhance solubility.

The product may be isolated in any convenient manner. One method is to first wash the reaction mixture with water, then with dilute aqueous sodium carbonate and again with water. The organic layer is separated, dried over an anhydrous drying agent such as sodium sulfate, filtered and the solvent removed in vacuo to leave the desired product as a residue. It may be purified by recrystallization, for example, from acetone-petroleum ether.

The new and valuable compounds prepared by this synthetic sequence, can be used as stated above for conversion to the therapeutically active compounds described and claimed in copending and concurrently filed patent application, Ser. No. 117,379. The process is illustrated by the following series of reactions.

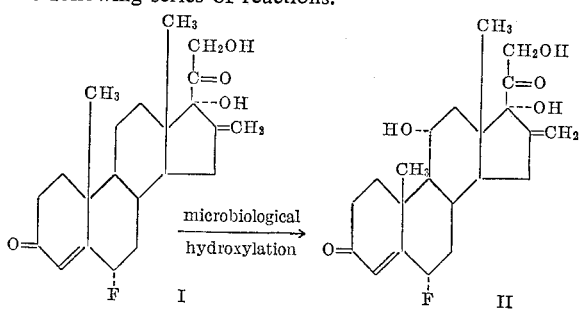

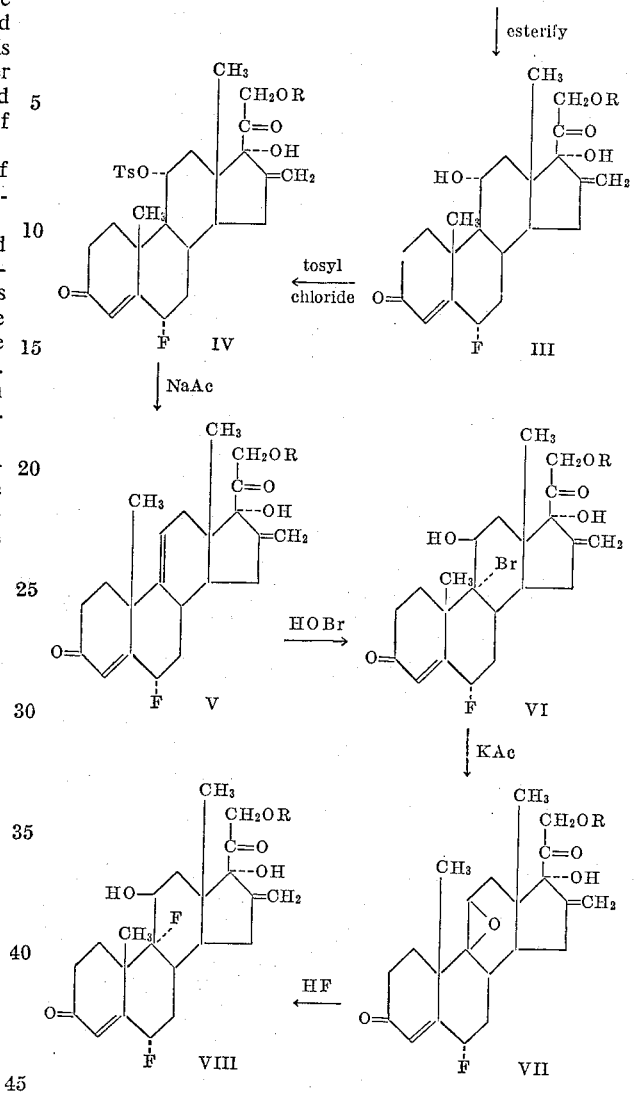

Compound VIII in the above reaction series is readily converted to A-ring and B-ring unsubstituted analogs including Δ¹,⁴-, Δ⁴,⁶-, and Δ¹,⁴,⁶-compounds. A double bond at the 1,2-position may be introduced by reaction with from about 1 to about 10 molar equivalents of selenium dioxide in a reaction inert solvent at a temperature of from about 75° C. to about 200° C. for a period of from about 1 to about 100 hours. A double bond at the 6,7-position is introduced by treatment with a quinone having an oxidation-reduction potential less than —0.5 at an elevated temperature between about 70° C. to about 190° C. in a reaction inert organic solvent having a boiling point of at least 70° C. selected from the group consisting of mononuclear aromatic hydrocarbons, mononuclear halogenated aromatic hydrocarbons, oxygenated polar aliphatic organic solvents and oxygenated polar alicyclic organic solvents. Useful solvents for the selenium dioxide reaction include tert-butanol containing a small amount of acetic acid. Useful solvents for the quinone reaction include xylene and n-amyl alcohol. The reactions can be carried out in either order. Thus starting with a Δ⁴-compound, one can first prepare a Δ⁴,⁶-compound for conversion to a Δ¹,⁴,⁶-compound or dehydrogenation at the 1,2-position can be initially effected and the Δ¹,⁴-compound may then be converted to its Δ¹,⁴,⁶-analog.

The following examples are given solely for the purpose of illustration and are not to be construed as limitations of this invention, many apparent variations of which are possible without departing from the spirit or scope thereof.

Example I.—16α,17α-epoxido-16β-methyl-Δ5-pregnene-3β-ol-20-one

A total of five grams of 16-methyl-Δ5,16-pregnadiene-3β-ol-20-one was taken up in 100 ml. of methanol. A 10% molar excess of an equimolar mixture prepared by adding 15% aqueous sodium hydroxide to a 20% hydrogen peroxide solution was added while maintaining the temperature between 25 and 30° C. The mixture was maintained at 30° C. for six hours. The mixture was then neutralized by the addition of 10% aqueous sodium hydroxide solution and extracted with methylene chloride. The organic solution was separated, dried over anhydrous sodium sulfate, filtered and the desired product recovered by removal of the solvent in vacuo.

Example II.—16α,17α-epoxido-16β-methyl-Δ5-pregnene-3β-ol-20-one

A total of five grams of 16-methyl-Δ5,16-pregnadiene-3β-ol-20-one was taken up in 100 ml. of methyl alcohol. A 1000% molar excess of an equimolar mixture prepared by adding 40% aqueous sodium hydroxide to a 35% hydrogen peroxide solution was added while maintaining the temperature between 25 and 30° C. The mixture was maintained at 30° C. for ½ hour. The mixture was then neutralized with 5% aqueous sodium carbonate solution and extracted with ethylene chloride. The organic solution was separated, dried over anhydrous magnesium sulfate, filtered and the desired product recovered by removal of the solvent in vacuo.

Example III.—16α,17α-epoxido-16β-methyl-Δ5-pregnene-3β-ol-20-one

A total of five grams of 16-methyl-Δ5,16-pregnadiene-3β-ol-20-one was taken up in 100 ml. of a 1:1 mixture of methyl alcohol and methylene chloride. A 10% molar excess of an equimolar mixture prepared by adding 15% aqueous sodium hydroxide to a 20% hydrogen peroxide solution was added while maintaining the temperature between 25 and 30° C. The mixture was maintained at 30° C. for six hours. The mixture was then neutralized by the addition of 10% aqueous sodium hydroxide solution and extracted with methylene chloride. The organic solution was separated, dried over anhydrous sodium sulfate, filtered and the desired product recovered by removal of the solvent in vacuo.

Example IV.—16α,17α-epoxido-16β-methyl-Δ5-pregnene-3β-ol-20-one

A total of five grams of 16-methyl-Δ5,16-pregnadiene-3β-ol-20-one was taken up in 100 ml. of a 1:1 mixture of ethyl alcohol and ethylene chloride. A 1000% molar excess of an equimolar mixture prepared by adding 40% aqueous sodium hydroxide to a 35% hydrogen peroxide solution was added while maintaining the temperature between 25 and 30° C. The mixture was maintained at 30° C. for ½ hour. The mixture was then neutralized with 5% aqueous sodium carbonate solution and extracted with ethylene chloride. The organic solution was separated, dried over anhydrous magnesium sulfate, filtered and the desired product recovered by removal of the solvent in vacuo.

Example V.—16α,17α-epoxido-16β-methyl-Δ5-pregnene-3β-ol-20-one

A total of five grams of 16-methyl-Δ5,16-pregnadiene-3β-ol-20-one was taken up in 100 ml. of a 1:1 mixture of ethyl alcohol and ethylene chloride. A 1000% molar excess of an equimolar mixture prepared by adding 20% aqueous sodium hydroxide to a 20% hydrogen peroxide solution was added while maintaining the temperature between 25 and 30° C. The mixture was maintained at 30° C. for ½ hour. The mixture was then neutralized with 5% aqueous sodium carbonate solution and extracted with ethylene chloride. The organic solution was separated, dried over anhydrous magnesium sulfate, filtered and the desired product recovered by removal of the solvent in vacuo.

Example VI.—16α,17α-epoxido-16β-methyl-21-iodo-Δ5-pregnene-3β-ol-20-one

A total of 1 gram of the product prepared in Example V was dissolved in 9 ml. of absolute ethanol and 18 cc. of tetrahydrofuran containing 0.018 gram of iodine per ml. of tetrahydrofuran. To this mixture, there was added 6 molar equivalents of calcium oxide and 2 molar equivalents of iodine. The reaction flask was stoppered and stirred magnetically at 40° C. for 2 hours. The mixture was then poured into 500 ml. of cold dilute aqueous sodium thiosulfate containing 10% by volume of glacial acetic acid. It was stirred at 5° C. for 2 hours and the product recovered by filtration.

Example VII.—16α,17α-epoxido-16β-methyl-21-iodo-Δ5-pregnene-3β-ol-20-one

A total of 0.15 gram of the product prepared in Example V was dissolved in 1.35 ml. of propanol and 2.7 ml. of tetrahydrofuran containing tertiary butyl hydroperoxide in a quantity equivalent to 0.012 gram of iodine per ml. of tetrahydrofuran. The air was displaced by nitrogen and 5 molar equivalents of calcium oxide and 1.75 molar equivalents of finely powdered iodine was added. The reaction flask was stoppered and stirred magnetically at 30° C. for 3 hours. The mixture was then poured into 200 ml. of water and sufficient solid sodium thiosulfate was added to decompose the excess iodine. The mixture was stirred vigorously for 5 minutes and the product recovered by filtration.

Example VIII.—16α,17α-epoxido-16β-methyl-21-iodo-Δ5-pregnene-3β-ol-20-one

A total of 0.15 gram of the product prepared in Example V was dissolved in 1.35 ml. of propanol and 2.7 ml. of tetrahydrofuran containing tertiary butyl hydroperoxide in a quantity equivalent to 0.012 gram of iodine per ml. of tetrahydrofuran. The air was displaced by nitrogen and 5 molar equivalents of calcium oxide and 1.75 molar equivalents of finely powdered iodine was added. The reaction flask was stoppered and stirred magnetically at 30° C. for 3 hours. The mixture was then poured into 200 ml. of water and sufficient solid sodium thiosulfate was added to decompose the excess iodine. The mixture was stirred vigorously for 5 minutes and the product recovered by filtration.

Example IX.—16α,17α-epoxido-16β-methyl-Δ5-pregnene-3β,21-diol-20-one 21-acetate A mixture containing 10 grams of the product prepared in Example VI was prepared. To this mixture, there was added 7.3 grams of potassium acetate in 3.6 liters of acetone. The mixture was refluxed for 16 hours and concentrated to a volume of approximately 100 ml. in vacuo. To the concentrate, there was added 275 ml. of water and the resulting solution was extracted three times with 300 ml. portions of chloroform. The combined chloroform extracts were washed successively with one 200 ml. portion of water, one 200 ml. portion of aqueous sodium bicarbonate and finally with a 200 ml. portion of water. The organic layer was separated, dried over magnesium sulfate, filtered and the desired product obtained by removal of the solvent in vacuo.

This procedure was also used to prepare the formate, propionate, butyrate and valerate esters of this compound.

Example X.—16α,17α-epoxido-16β-methyl-Δ5-pregnene-3β,21-diol-20-one 21-acetate A solution containing 20 grams of the product prepared in Example VI and a 2000% molar excess of potassium acetate was added. The mixture was maintained at 56° C. for 24 hours and the solvent removed in vacuo.

The residue was washed with water, filtered and dried to yield the desired product.

The formate, propionate, butyrate, isobutyrate and valerate were similarly prepared.

Example XI.—16α,17α-epoxido-16β-methyl-Δ⁵-pregnene-3β,21-diol-20-one-21-acetate

A solution containing 20 grams of the product prepared in Example VI was prepared and a 200% molar excess of sodium acetate was added. The mixture was maintained at 100° C. for 4 hours and the solvent removed in vacuo. The residue was washed with water, filtered and drie to yield the desired product.

Example XII.—5α-bromo-6β-fluoro-16α,17α-epoxido-16β-methyl-pregnane-3β,21-diol-20-one 21-acetate Anhydrous hydrogen fluoride (168 grams) was collected directly from the cylinder in a polyethylene vessel and cooled to −70° C. It was cautiously added to dry tetrahydrofuran also cooled to −70° C. and contained in a polyethylene vessel. Considerable heat was evolved, the temperature rising to approximately 0° C. The mixture was re-cooled to −70° C. and then added with vigorour stirring to a suspension of finely powdered N-bromoacetamide (26.75 grams) and 16α,17α-epoxido-16β-methyl - Δ⁵ - pregnene - 3β,21 - diol - 20 - one 21 - acetate (55 grams) in 435 ml. of methylene chloride at −70° C. After maintaining for one hour at between −50° C. and −70° C., the entire reaction mixture was poured cautiously into 3 liters of water containing 800 grams of potassium carbonate, the mixture being stirred during the addition. The organic layer was separated and the aqueous layer extracted with two 100 ml. portions of methylene chloride. The combined organic layers were washed with 5% potassium bicarbonate solution until neutral, then with water and finally dried over anhydrous sodium sulfate. The solpent was removed in vacuo to leave the desired product as a residue.

The procedure of this example was used to prepare the formate, propionate, butyrate and valerate esters of the title compound.

Example XIII.—5α-bromo-6β-fluoro-16α,17α-epoxido-16β-methyl-pregnane-3β,21-diol-20-one 21-acetate A total of 0.5 mole of 16α,17α-epoxido-16β-methyl-Δ⁵-pregnene-3β,21-diol-20-one 21-acetate in 300 ml. of methylene chloride was cooled to −80° C. To this mixture, there was added 0.52 mole of N-bromoacetamide and 12.5 moles of anhydrous hydrogen fluoride in 300 ml. of a tetrahydrofuran-methylene chloride solvent mixture containing 120 ml. of tetrahydrofuran. The solvent system of the final reaction mixture contained 20% tetrahydrofuran. The mixture was maintained at −80° C. for 16 hours and the product isolated as described in Example XII.

Example XIV.—5α-bromo-6β-fluoro-16α,17α-epoxido-16β-methyl-pregnane-3β,21-diol-20-one 21-acetate A total of 0.5 mole of 16α,17α-epoxido-16β-methyl-Δ⁵-pregnene-3β,21-diol-20-one 21-acetate was taken up in 300 ml. of methylene chloride at −50° C. To this mixture, there was added 0.75 mole of N-bromoacetamide in 50 moles of anhydrous hydrogen fluoride in 300 ml. of tetrahydrofuran-methylene chloride solvent mixture containing 240 ml. of tetrahydrofuran. The solvent system of the final reaction mixture contained 40% tetrahydrofuran. The mixture was maintained at −50° C. for 1 hour and the product isolated as described in Example XII.

Example XV.—5α-bromo-6β-fluoro-16α,17α-epoxido-16β-methyl-pregnane-3β,21-diol-20-one 21-acetate A total of 0.5 mole of 16α,17α-epoxido-16β-methyl-Δ⁵-pregnene-3β,21-diol-20-one 21-acetate in 300 ml. of chloroform was cooled to −80° C. To this mixture, there was added 0.52 mole of N-bromoacetamide and 12.5 moles of anhydrous hydrogen fluoride in 300 ml. of a dioxane-chloroform solvent mixture containing 120 ml. of dioxane. The solvent system of the final reaction mixture contained 20% dioxane. The mixture was maintained at −80° C. for 16 hours and the product isolated as described in Example XII.

Example XVI.—5α-bromo-6β-fluoro-16α,17α-epoxido-16β-methyl-pregnane-3β,21-diol-20-one 21-acetate A total of 0.5 mole of 16α,17α-epoxido-16β-methyl-Δ⁵-pregnene-3β,21-diol-20-one 21-acetate was taken up in 300 ml. of chloroform at −50° C. To this mixture, there was added 0.75 mole of N-bromoacetamide and 50 moles of anhydrous hydrogen fluoride in 300 ml. of dioxane-chloroform solvent mixture containing 240 ml. of dioxane. The solvent system of the final reaction mixture contained 40% dioxane. The mixture was maintained at −50° C. for 1 hour and the product isolated as described in Example XII.

The procedure of this example was used to prepare the formate, propionate, butyrate and valerate esters of the title compound.

Example XVII.—5α-bromo-6β-fluoro-16α,17α-epoxido-16β-methyl-pregnane-21-ol-3,20-dione 21-acetate A total of 20 grams of 5α-bromo-6β-fluoro-16α,17α-epoxido - 16β-methyl-pregnane-3β,21-diol-20-one 21-acetate in 1500 ml. of acetone at 10° C. was treated with 30 ml. of 8 N chromic acid reagent added in one portion with vigorous stirring. After 5 minutes, the reaction temperature rose to 22° C. and the entire mixture was poured into 10 liters of water which caused precipitation of the ketone. The ketone was collected by filtration, washed with water and air-dried. An additional portion of the desired product was isolated by extracting the aqueous filtrate with chloroform, drying the organic layer over anhydrous sodium sulfate, filtering and evaporating the solvent in vacuo.

Example XVIII.—5α-bromo-6β-fluoro-16α,17α-epoxido-16β-methyl-pregnane-21-ol-3,20-dione 21-acetate To a solution of 5 grams of 5α-bromo-6β-fluoro-16α,17α - epoxido-16β-methyl-pregnane-3β,21-diol-20-one 21-acetate in 25 ml. of glacial acetic acid, there was added 15 ml. of a solution of chromium trioxide in 9:1 acetic acid-water solution containing 76 mg. of chromium trioxide per ml. of solution. The mixture was kept at room temperature during the addition and for an additional 4 hours. The desired product was precipitated by the addition of water and collected by filtration.

The procedure of this example was used to prepare the formate, propionate, butyrate and valerate esters of the title compound.

Example XIX.—5α-bromo-6β-fluoro-16α,17α-epoxido-16β-methyl-pregnane-21-ol-3,20-dione 21-acetate Chromic anhydride (0.125 gram) was added to 15 ml. of pyridine at approximately 5° C. and the mixture allowed to warm spontaneously to room temperature. To this solution, there was added 2.5 grams of 5α-bromo-6β-fluoro - 16α,17α - epoxido - 16β-methyl-pregnane-3β,21-diol-20-one 21-acetate in 20 ml. of pyridine and the mixture was allowed to stand at room temperature for 25 hours. The solution was extracted with ether and the ether solution washed twice with 5% aqueous hydrochloric acid and then with water. The ether layer was dried over anhydrous sodium sulfate, filtered and the desired product obtained by removal of the ether in vacuo.

Example XX.—5α-bromo-6β-fluoro-16α,17α-epoxido-16β-methyl-pregnane-21-ol-3,20-dione 21-acetate A solution of 0.5 gram of sodium dichromate dihydrate in 10 ml. of glacial acetic acid was added over a 30-minute period to 0.25 gram of 5α-bromo-6β-fluoro-16α, 17α-epoxido-16β-methyl-pregnane-3β,21-diol-20-one in 50 ml. of 1:1 glacial acetic acid-benzene at 10° C. After 1 hour, an additional 0.3 gram of oxidizing agent in 7 ml. of solvent was added and the mixture left standing for 24 hours at 10° C. It was poured into cold aqueous sodium bisulfite solution and the solution extracted with ether. The organic layer was washed with water until the washings were neutral, dried over anhydrous sodium sulfate, filtered and the ether removed in vacuo to isolate the desired product.

The procedure of this example was used to prepare the formate, propionate, butyrate and valerate esters of the title compound.

Example XXI.—5α-bromo-6β-fluoro-16α,17α-epoxido-16β-methyl-pregnane-21-ol-3,20-dione 21-acetate A total of 20 grams of 5α-bromo-6β-fluoro-16α,17α-epoxido-16β-methyl-pregnane-3β,21-diol-20-one in 1500 ml. of acetone at 10° C. was treated with 30 ml. of 8 N chromic acid reagent added in one portion with vigorous stirring. After 5 minutes the reaction temperature rose to 22° C. and the entire mixture was poured into 10 liters of water which caused precipitation of the desired compound which was collected by filtration, washed with water and air-dried.

Example XXII.—5α-bromo-6β-fluoro-16α,17α-epoxido-16β-methyl-pregnane-21-ol-3,20-dione 21-acetate A total of 20 grams of 5α-bromo-6β-fluoro-16α,17α-epoxido-16β-methyl-pregnane-3β,21-diol-20-one in 1500 ml. of acetone at 10° C. was treated with 30 ml. of 8 N chromic acid reagent added in one portion with vigorous stirring. After 5 minutes, the reaction temperature rose to 22° C. and the entire mixture was poured into 10 liters of water which caused precipitation of the desired compound.

The procedure of this example was used to prepare the formate, propionate, butyrate and valerate esters of the title compound.

Example XXIII.—6β-fluoro-16α,17α-epoxido-16β-methyl-Δ⁴-pregnene-21-ol-3,20-dione 21-acetate A mixture containing 50 grams of 5α-bromo-6β-fluoro-pregnane-21-ol-3,20-dione 21-acetate and an equimolar portion of anhydrous sodium acetate was refluxed for 40 minutes in 1500 ml. of ethanol. The mixture was then poured into 8 liters of water and the desired product which precipitated was collected by filtration.

Example XXIV.—6β-fluoro-16α,17α-epoxido-16β-methyl-Δ⁴-pregnene-21-ol-3,20-dione 21-acetate A mixture containing 50 grams of 5α-bromo-6β-fluoro-pregnane-21-ol-3,20-dione 21-acetate together with a 200% molar excess of sodium propionate in 1500 ml. of ethyl acetate was refluxed for 4 hours. The solvent was then removed by distillation in vacuo and the residue washed with water to leave the desired product.

Example XXV.—6β-fluoro-16α,17α-epoxido-16β-methyl-Δ⁴-pregnene-21-ol-3,20-dione 21-acetate A mixture of 50 grams of 5α-bromo-6β-fluoro-pregnane-21-ol-3,20-dione 21-acetate and a 100% molar excess of potassium acetate in 1500 ml. of di-n-butyl ketone was maintained at 130° C. for one-half hour. The solvent was removed in vacuo and the residue washed with water to leave the desired product.

The procedure of this example was used to prepare the formate, propionate, butyrate and valerate esters of the title compound.

Example XXVI.—6β-fluoro-16α,17α-epoxido-16β-methyl-Δ⁴-pregnene-21-ol-3,20-dione 21-acetate A mixture containing 50 grams of 5α-bromo-6β-fluoro-pregnane-21-ol-3,20-dione 21-acetate together with a 100% excess of sodium carbonate in 1500 ml. of acetone was refluxed for 2 hours. The mixture was then poured into 8 liters of water and the desired product which precipitated was collected by filtration.

Example XXVII.—6β-fluoro-16α,17α-epoxido-16β-methyl-Δ⁴-pregnene-21-ol-3,20-dione-21-acetate A mixture containing 50 grams of 5α-bromo-6β-fluoro-pregnane-21-ol-3,20-dione 21-acetate together with a 40% molar excess of sodium bicarbonate was maintained at 50° C. in 1500 ml. of ethanol for 4 hours. The mixture was then poured into 8 liters of water and the desired product which precipitated was collected by filtration.

The procedure of this example was used to prepare the formate, propionate, butyrate and valerate esters of the title compound.

Example XXVIII.—6α-fluoro-16-methylene-Δ⁴-pregnene-17α,21-diol-3,20-dione 21-acetate A total of 5 g. of 6β-fluoro-16α,17α-epoxido-16β-methyl-Δ⁴-pregnene-21-ol-3,20-dione 21-acetate was taken up in 100 ml. of ethylene chloride and 0.1 molar equivalents of hydrogen bromide dissolved in 15 ml. of acetic acid was added. The mixture was maintained at 15° C. for 24 hours. It was then washed with an equal volume of water and this was followed with a second washing with an equal volume of 5% aqueous sodium carbonate solution and a third wash with an equal volume of water. The organic layer was separated, dried over anhydrous sodium sulfate, filtered and the desired product recovered by removal of the solvent in vacuo. It was purified by recrystallization with acetone-petroleum ether.

The procedure of this example was used to prepare the formate, propionate, butyrate and valerate esters of the title compound.

Example XXIX.—6α-fluoro-16-methylene-Δ⁴-pregnene-17α,21-diol-3,20-dione 21-acetate A total of 5 g. of 6β-fluoro-16α,17α-epoxido-16β-methyl-Δ⁴-pregnene-21-ol-3,20-dione 21-acetate was taken up in 100 ml. of methylene chloride and 0.33 molar equivalents of hydrogen bromide dissolved in 15 ml. of valeric acid was added. The mixture was maintained at 40° C. for 4 hours. It was then washed with an equal volume of water and this was followed with a second washing with an equal volume of 5% aqueous sodium carbonate solution and a third wash with an equal volume of water. The organic layer was separated, dried over anhydrous sodium sulfate, filtered and the desired product recovered by removal of the solvent in vacuo. It was purified by recrystallization with acetone-petroleum ether.

Example XXX.—6α-fluoro-16-methylene-Δ⁴-pregnene-17α,21-diol-3,20-dione 21-acetate A total of 5 g. of 6β-fluoro-16α,17α-epoxido-16β-methyl-Δ⁴-pregnene-21-ol-3,20-dione 21-acetate was taken up in 100 ml. of ethylene chloride and 0.1 molar equivalents of hydrogen bromide dissolved in 15 ml. of acetic acid was added. The mixture was maintained at 15° C. for 24 hours. It was then washed with an equal volume of water and this was followed with a second washing with an equal volume of 5% aqueous sodium carbonate solution and a third wash with an equal volume of water. The organic layer was separated, dried over anhydrous sodium sulfate, filtered and the desired product recovered by removal of the solvent in vacuo. It was purified by recrystallization with acetone-petroleum ether.

The following preparations illustrate the use of a product of this reaction in the preparation of a therapeutically useful compound described and claimed in co-pending and concurrently filed patent application S.N. 117,379.

Preparation I.—6α-fluoro-16-methylene-Δ⁴-pregnene-11α,17α,21-triol-3,20-dione

A culture of *Rhizopus nigricans* Enrb. ATCC 6227b was propagated on an agar nutrient medium. The organism was rinsed from the agar slant under sterile conditions into a sterile medium having the following composition:

| | Percent |
|---|---|
| Malt extract | 5 |
| Sucrose | 1 |
| Sodium nitrate | 0.2 |
| Potassium chloride | 0.05 |
| Magnesium sulfate heptahydrate | 0.05 |
| Ferrous sulfate heptahydrate | 0.05 |
| Dipotassium acid phosphate | 0.1 |

Distilled water adjusted to pH 7.0 with potassium hydroxide.

One hundred ml. of this medium were used in each of several 300 ml. flasks. To each flask was added 50 mg. of 6α-fluoro-16-methylene-Δ⁴-pregnene-17α,21-diol - 3,20-dione 21-acetate dissolved in a small volume of acetone. Throughout these operations, the fermentation mixture was maintained under aseptic conditons. The mixture was shaken for a period of seven days at a temperature of about 28° C. The contents of the flasks were combined and extracted with several portions of methylene chloride using ⅕ the volume of aqueous phase each time. The combined methylene chloride extracts were dried over anhydrous sodium sulfate and after the drying agent was removed, the solution was concentrated to a volume of approximately 2 ml. The concentrate was placed on a chromatographic column consisting of silica gel mixed with a small volume of ethanol (1 ml. of solvent per gram of silica gel). The column was developed by means of a mixture of 97 volumes of methylene chloride and 3 volumes of 95% ethanol. The effluent from the column was collected in small fractions of equal volume and periodically these were examined by means of paper chromatography in order to separate the fractions containing the desired product. All of these fractions were combined and concentrated in vacuo to dryness to obtain the desired product.

Preparation II.—6α-fluoro-16-methylene-Δ⁴-pregnene-11α,17α,21-triol-3,20-dione 21-acetate A total of 5 g. of 6α-fluoro-16-methylene-Δ⁴-pregnene-11α,17α,21-triol-3,20-dione was taken up in 50 ml. of pyridine and a 10% molar excess of acetic anhydride was added. It was allowed to stand at 20° C. for 24 hours. It was then evaporated to dryness and the residue taken up in 50 ml. of chloroform. The chloroform solution was washed twice with 50 ml. portions of water, the organic layer separated, dried over anhydrous magnesium sulfate, filtered, and the desired product recovered by removing the solvent in vacuo.

Preparation III.—6α-fluoro-16-methylene-Δ⁴-pregnene-11α,17α,21-triol-3,20-dione-11-tosylate 21-acetate A total of 19 g. of 6α-fluoro-16-methylene-Δ⁴-pregnene-11α,17α,21-triol-21-acetate was taken up in 300 ml. of chloroform containing a molar equivalent of pyridine and a molar equivalent of p-toluenesulfonyl chloride was added drop-wise while maintaining the temperature at 0° C. The mixture was allowed to stand for 60 hours and then a mixture of 200 grams of crushed ice in 1200 ml. of water was added with vigorous stirring. The mixture was extracted with chloroform and the chloroform solution washed first with cold dilute hydrochloric acid, then with dilute sodium bicarbonate and finally with water. It was dried over sodium sulfate, filtered and the solvent removed in vacuo to leave the desired product as a residue.

Preparation IV.—6α-fluoro-16-methylene-Δ⁴,⁹⁽¹¹⁾-pregnadiene-17α,21-diol-3,20-dione 21-acetate A total of 4.8 g. of the product prepared in the previous example was taken up in 125 ml. of acetic acid containing 6.5 grams of sodium acetate and the resulting mixture was refluxed for 45 minutes. After cooling, 600 ml. of water was added and the desired product precipitated. It was collected by filtration.

Preparation V.—6α-fluoro-9α-bromo-16-methylene-Δ⁴-pregnene-11β,17α,21-triol-3,20-dione 21-acetate To a suspension of 1 g. of 6α-fluoro-16-methylene-Δ⁴,⁹⁽¹¹⁾-pregnadiene-17α,21-diol 21-acetate in 50 ml. of peroxide-free dioxane containing a 50% molar excess of p-toluene sulfonic acid in 1 N aqueous solution, there was added in the dark with stirring at 25° C., a 50% molar excess of N-bromoacetamide. The mixture was maintained at this temperature for 4 hours and the product precipitated by addition to ice water. It was recovered by filtration.

Preparation VI.—6α-fluoro-9β-11β-epoxido-16-methylene-Δ⁴-pregnene-17α,21-diol-3,20-dione 21-acetate To a solution of 5 g. of 6α-fluoro-9α-bromo-16-methylene-Δ⁴-pregnene - 11β,17α,21 - triol-21-acetate in 200 ml. of dioxane, there was added an equimolar solution of anhydrous potassium acetate in 320 ml. of absolute ethanol. The mixture was refluxed for 1 hour. After cooling in an ice bath, 400 ml. of ice water was added with stirring and the desired product precipitated.

Preparation VII.—6,9α-difluoro-16-methylene-Δ⁴-pregnene-11β,17α,21-triol-3,20-dione 21-acetate To a solution of 0.4 mole of anhydrous hydrogen fluoride and 0.24 mole of tetrahydrofuran in 25 ml. of chloroform chilled to 0° C., there was added a solution of 0.05 mole of 6α-fluoro-9β,11β-epoxido-16-methylene-Δ⁴-pregnene-17α,21-diol-3,20-dione 21-acetate in 25 ml. of chloroform previously chilled to this same temperature. The mixture was maintained at 0° C. for 20 hours and then allowed to come to room temperature. To the mixture, there was added 50 ml. of 5% aqueous potassium carbonate with constant stirring. The organic layer was separated and the aqueous layer extracted twice with equal volumes of chloroform. The combined organic layers were washed with water, dried over anhydrous sodium sulfate, filtered and the solvent removed in vacuo to leave the desired product.

Many of the reactions shown above illustrate the process of the invention as applied to 21-esters. In the application of the process of this invention, it is preferred to use esters. The free 21-alcohols of all of the new compounds of this invention are also useful and it is intended to include them within the scope of the invention. They may be used in purification procedures. For example, if an impure ester product is obtained in a reaction, it may be hydrolyzed under standard conditions, isolated and reacylated to provide the original ester or a new one in a more pure form.

What is claimed is:
1. A process which comprises reacting a compound having the formula

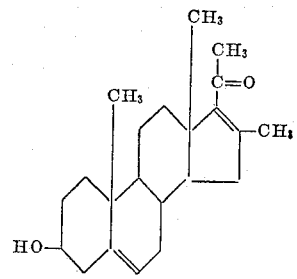

with at least a 10% molar excess of an equimolar mixture of aqueous sodium hydroxide and hydrogen peroxide at a temperature of from about 18° C. to about 35° C. for a period of from about ½ to about 6 hours to produce a compound having the formula:

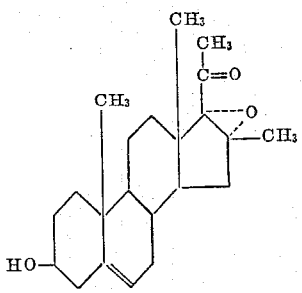

reacting resulting compound with from 4 to 6 molar equivalents of calcium oxide and 1.5 to 2 molar equivalents of iodine in a solvent system comprising two volumes of tetrahydrofuran and one volume of a lower alkanol containing up to four carbon atoms, the said solvent system containing tertiary butyl hydrogen peroxide in a quantity equivalent to from 0.006 to 0.018 g. of iodine per ml. of tetrahydrofuran at a temperature of from about 20° C. to about 40° C. for a period of from about two to about five hours to produce a compound having the formula

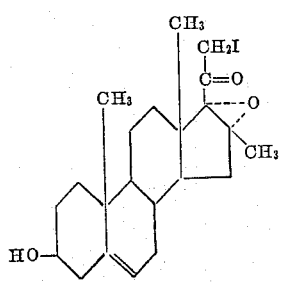

reacting resulting compound with from about 200% molar excess to about 2000% molar excess of a reagent selected from the group consisting of sodium and potassium salts of fatty acids containing up to five carbon atoms in a solvent selected from the group consisting of dimethylformamide and aliphatic esters and ketones containing up to five carbon atoms at a temperature of from about 40° C. to about 100° C. for a period of from about 4 to about 24 hours to produce the compound having the formula

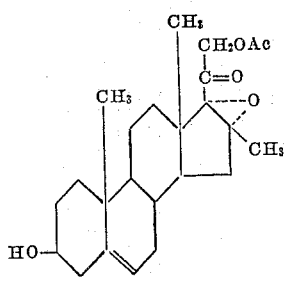

wherein Ac is an acyl hydrocarbon group containing only carbon, hydrogen, and oxygen up to a total of five carbon atoms; reacting resulting compound with from about 1.05 to about 1.5 molar equivalents of N-bromoacetamide and from about 25 to about 100 molar equivalents of anhydrous hydrogen fluoride in a solvent system consisting of tetrahydrofuran and methylene chloride containing from about 20% to about 40% tetrahydrofuran by volume at a temperature of from about −80° C. to about −50° C. for a period of about 1 to about 16 hours to produce a compound having the formula

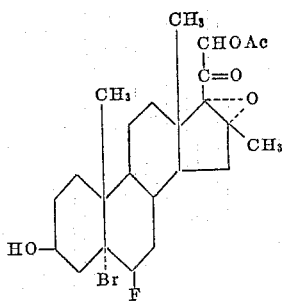

wherein Ac has the same meaning as above; oxidizing resulting compound to produce the compound having the formula

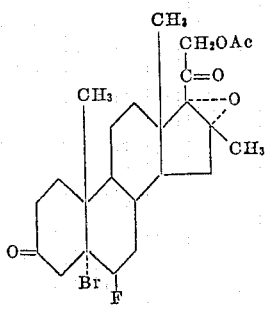

wherein Ac has the same meaning as above; reacting said compound with from about a molar equivalent to about a 200% molar excess of an alkaline reagent in a solvent selected from the group consisting of alkanols, esters and ketones, containing up to nine carbon atoms at a temperature of about 50° C. to about 130° C. for a period of about ½ to about 1 hour to produce a compound having the formula

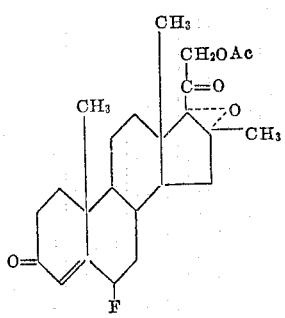

wherein Ac has the same meaning as above and reacting resulting compound with hydrogen bromide in a reaction inert organic solvent at a temperature of from about 15° C. to about 40° C. for a period of from about 4 to about 24 hours to produce a compound having the formula

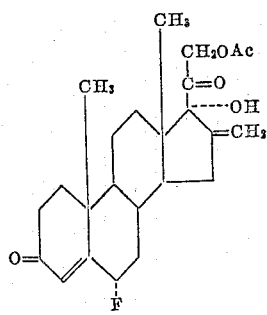

wherein Ac has the same meaning as above.

2. A compound selected from the group consisting of 5α-bromo-6β-fluoro-16α,17α-epoxido-16β-methylpregnane-3β,21-diol-20-one and the 21-acyl esters thereof wherein the acyl moiety contains only carbon, hydrogen and oxygen up to a total of five carbon atoms.

3. A compound selected from the group consisting of 5α-bromo-6β-fluoro-16α,17α-epoxido-16β-methylpregnane-21-ol-3,20-dione and the 21-acyl esters thereof wherein the acyl moiety contains only carbon, hydrogen and oxygen up to a total of five carbon atoms.

4. A compound selected from the group consisting of 6β-fluoro-16α,17α-epoxido-16β-methyl-$\Delta^4$-pregnene-21-ol-3,20-dione and the 21-acyl esters thereof wherein the acyl moiety contains only carbon, hydrogen and oxygen up to a total of five carbon atoms.

5. A compound selected from the group consisting of 6α-fluoro-16-methylene-$\Delta^2$-pregnene-17α,21-diol-3,20-dione and the 21-acyl esters thereof wherein the acyl moiety contains only carbon, hydrogen and oxygen up to a total of five carbon atoms.

References Cited
UNITED STATES PATENTS

| | | | |
|---|---|---|---|
| 2,805,230 | 9/1957 | Stork et al. | 260—397.4 |
| 3,074,977 | 1/1963 | Mannhardt et al. | 260—397.4 |
| 3,014,936 | 12/1961 | Mancera et al. | 260—397.45 |
| 2,750,381 | 6/1956 | Hogg et al. | 260—239.55 |
| 2,820,030 | 1/1958 | Julian | 260—239.55 |

OTHER REFERENCES

Bowers et al.: "Tetrahedron," Sept. 1959, vol. 7, pages 153 to 162.

Derwent: Belgian Report No. 60A, page A17 relied on, Nov. 30, 1959.

Kirk et al.: "Journal Chemical Society," June 10, 1960, page 2385 relied on.

ELBERT L. ROBERTS, *Primary Examiner.*

L. H. GASTON, M. LIEBERMAN, I. MARCUS, L. GOTTS, *Examiners.*